INVENTORS
Robert A. Woods and
Herbert L. Bone.
BY
W. L. Stout
THEIR ATTORNEY

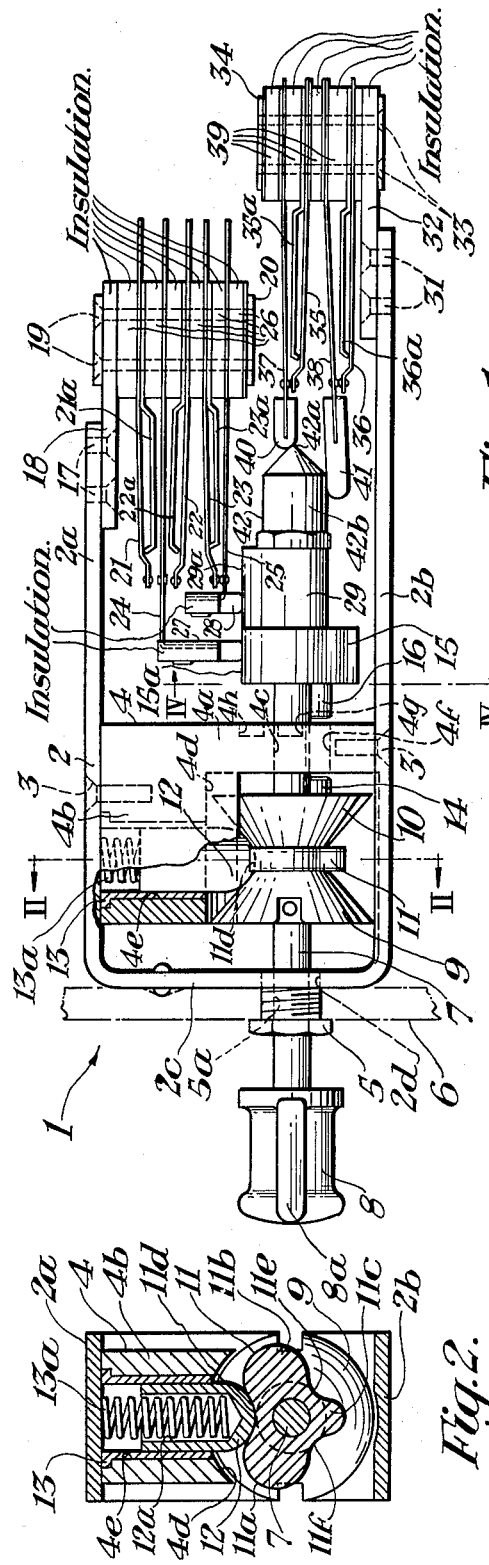
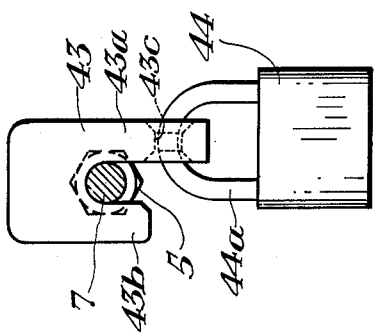
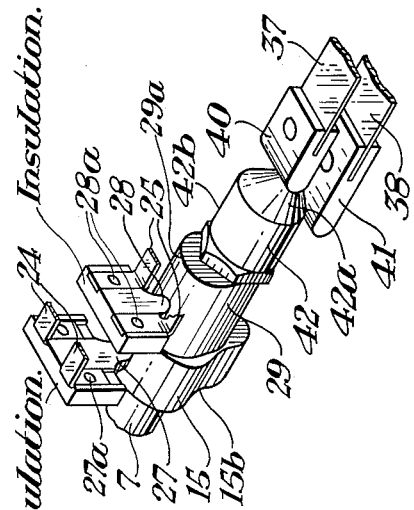
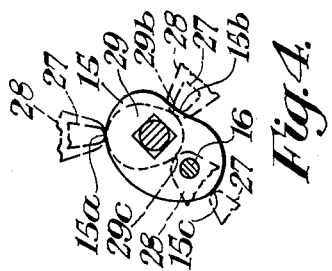
INVENTORS
Robert A. Woods and
Herbert L. Bone.
BY
W. L. Stout
THEIR ATTORNEY

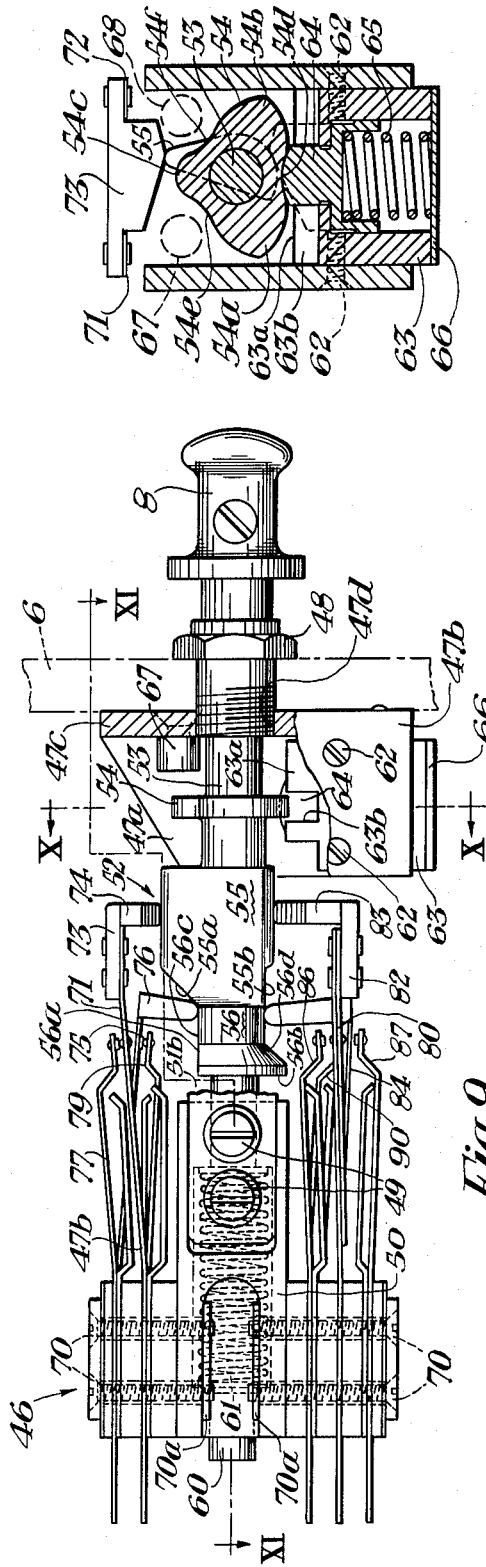

INVENTORS
Robert A. Woods and
Herbert L. Bone.
BY
W. L. Stout.
THEIR ATTORNEY

United States Patent Office 2,748,204
Patented May 29, 1956

2,748,204

CIRCUIT CONTROLLERS

Robert A. Woods, Verona, and Herbert L. Bone, Forest Hills, Pa., assignors to Westinghouse Air Brake Company, Wilmerding, Pa., a corporation of Pennsylvania Application October 23, 1952, Serial No. 316,336

16 Claims. (Cl. 200—4)

Our present invention relates to circuit controllers, and particularly to circuit controllers for assembly on a control board or track diagram together with other similar units for controlling railway signals, switches, or other apparatus.

In railway classification yards, a great many track switches are used to route freight cars from a single track into a large number of tracks or sidings according to the ultimate destination of the cars. Car retarders are also used in such yards to control the speed of the freight cars to reduce the impact of the cars as they are coupled to cars already in the sidings. The track switches and car retarders are remotely controlled by one or more operators in centrally located control towers. The control machine with which an operator sets up the routes of each freight car, or cut of cars, comprises a control panel on which a minature diagram of the tracks and switches is laid out, together with panel lights, respresentative of the signals at the switch locations. To control the various functions in setting up the routes, the track diagram is further provided with push buttons and circuit controllers. The routes of the freight cars may be set up automatically by a series of push buttons, the speed of the cars also being automatically controlled.

In the operation of a classification yard system, it is desirable at times to cancel the route or routes automatically set up for a particular car or cut of cars and to be able to control the yard switches from the control point; the switches being operated either to or from their normal and reverse positions. It is further desirable to either test or set up a restrictive signal governing traffic over a particular yard switch from the control point. These five control functions require five sets of control contacts, the individual assembly of which on the track diagram would be quite complicated and possibly lead to confusion.

It is, therefore, an object of our present invention to provide a circuit controller whereby five control functions may be performed which requires but a minimum of space and which can be constructed at a minimum of cost.

Another object of our invention is to provide a circuit controller of the character indicated which is readily assembled to a control panel or track diagram, has a construction which insures reliability of operation and wherein the control lever of the circuit controller forms a part of the track diagram to indicate in conjunction with the track diagram the function performed by the circuit controller.

According to our invention at least three cams are provided on an operating shaft and are rotatable as a unitary element by an operating lever. One of such cams is a positioning cam whereby the operating shaft is held in three distinct rotary or angular positions, the operating lever serving as an index of the angular position of the operating shaft. The remaining cams are so formed that the electrical contacts associated with each of the cams are actuated only in the three angular positions of the operating shaft. Other electrical contacts are provided for the circuit controller which are actuated only upon the longitudinal movement of the operating shaft. The longitudinal movement of the shaft either by pushing in or pulling out of the operating lever is limited to only one predetermined angular position of the operating shaft. In the remaining two angular positions of the operating shaft a partial withdrawal of the operating shaft is possible to permit the locking of the circuit controller operating lever. In the partial withdrawal of the operating lever in either of the two permissible rotary positions, none of the electrical contacts are actuated except those actuated by their cams due to the particular angular position of such cams.

Other objects and characteristic features of our invention will become apparent as the description proceeds.

We shall describe two circuit controllers embodying our invention, and shall then point out the novel features thereof in claims.

In the accompanying drawings,

Fig. 1 is a side elevational view of a circuit controller embodying our invention, a portion thereof being broken away to illustrate to better advantage details of construction.

Fig. 2 is a sectional view taken along the line II—II of Fig. 1.

Fig. 3 is an isometric view of the cam arrangement for the circuit controller.

Fig. 4 is a sectional view taken along the line IV—IV of Fig. 1.

Figure 5:
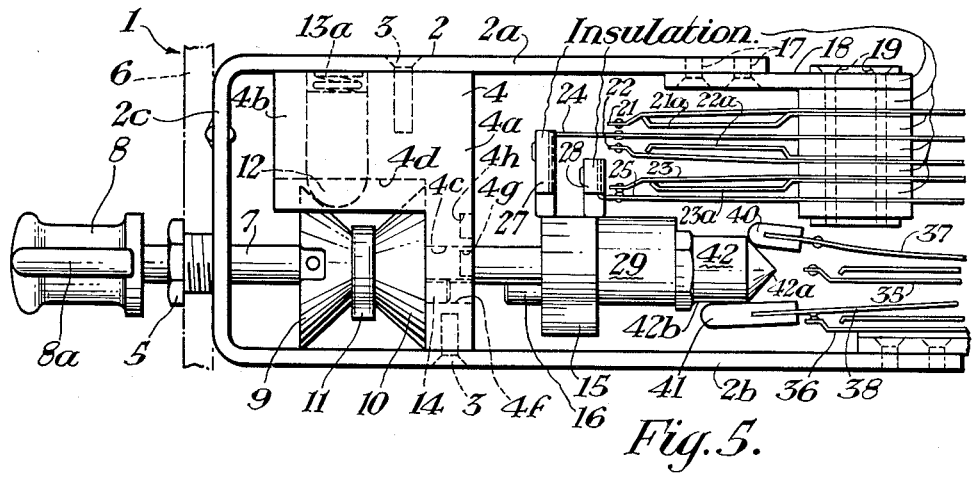
Figure 6:
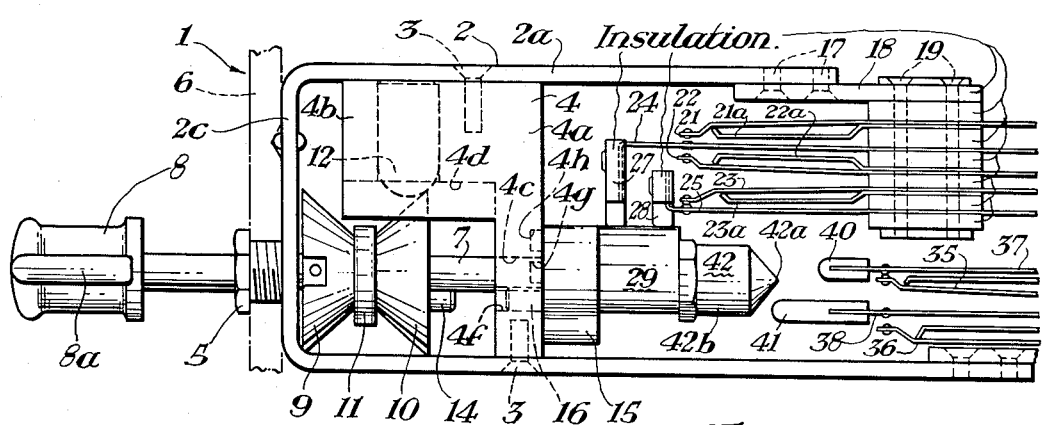
Figure 7:
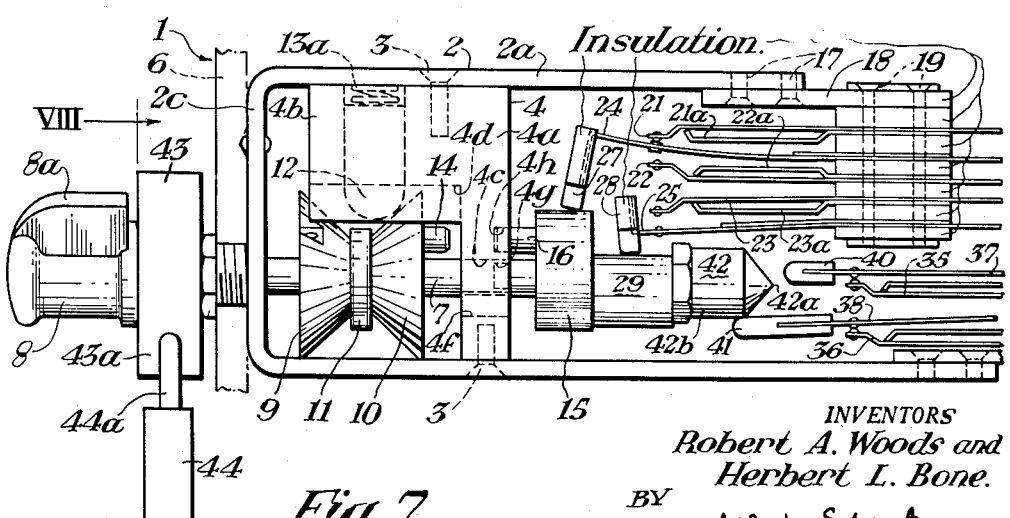

Figs. 5, 6, and 7 are side elevational views illustrating the cooperation of the cams and their contacts in various positions of the operating lever.

Fig. 8 is a sectional view taken along the line VIII—VIII of Fig. 7 showing a lever block and padlock used to lock the operating shaft against unauthorized movement under certain conditions.

Fig. 9 is a side elevational view of a second embodiment of our invention, a portion thereof being broken away to illustrate details of construction.

Fig. 10 is a sectional view taken along the line X—X of Fig. 9.

Fig. 11 is a sectional view of the circuit controller taken along the line XI—XI of Fig. 9.

Figure 12:
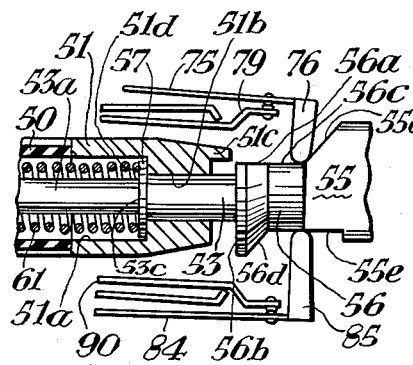

Fig. 12 is a fragmentary vertical sectional view of the operating shaft and cam arrangement for operating certain of the electrical contacts.

Figure 13:
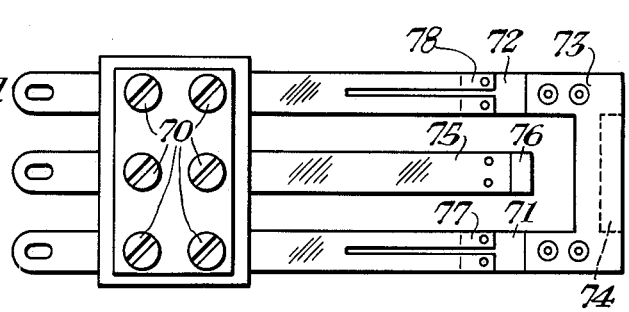
Figure 14:
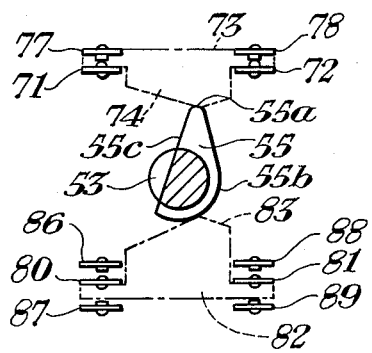
Figure 15:
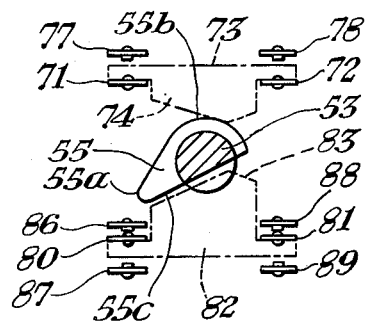
Figure 16:
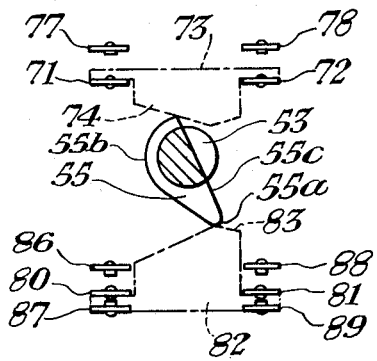

Fig. 13 is a top plan view illustrating the contact arrangement for the circuit controller, while Figs. 14, 15, and 16 illustrate the cooperation of certain of the circuit controller cams with certain of the controller contacts in various positions of the operating lever.

Referring now in detail to Figs. 1 to 3 of the drawings, the reference character 1 designates a circuit controller embodying our invention. The circuit controller comprises a U-shaped mounting bracket 2 having upper and lower horizontal arms 2a and 2b interconnected by a vertical portion 2c. Secured to the upper and lower arms of the mounting bracket as by screws 3, is a bracket 4. The bracket 4 comprises a wall section 4a which extends across the opening between the two bracket arms 2a and 2b and a shoulder section 4b adjacent the arms 2a and extending toward the vertical portion 2c of the mounting bracket.

The vertical portion 2c of the U-shaped mounting bracket is provided with a threaded opening 2d. In axial alignment with the threaded opening 2d is an opening 4c in the wall section of bracket 4. Threaded into the opening 2d of the mounting bracket is a bushing 5 formed with a through opening 5a. The bushing 5 serves to secure the mounting bracket 2 to the rear surface of a suitable panel 6 in the usual manner. The opening 5a of the bushing provides a bearing surface for an operating shaft 7 which passes through the opening 4c in the wall section of the bracket 4. Secured to the outer end of the operating shaft is an operating lever 8 formed with a radially extending extension 8a which serves as a thumb piece for the lever and an indexing means to indicate the angular displacement of the lever and operating shaft 7.

Secured to the operating shaft 7 are two conical cams 9 and 10 having interposed therebetween a three-lobed peripheral cam 11 (Fig. 2), hereinafter referred to as the positioning cam 11. For purposes hereinafter appearing, the inner or base end of the conical cam 10 is spaced from the wall section 4a. The positioning cam 11 comprises three lobes 11a, 11b and 11c, the lobes 11a and 11b being of the same size and larger than the third lobe 11c. Between the lobes of the cam are low points 11d, 11e and 11f, the low points 11d and 11e and 11d and 11f being spaced approximately 135° apart, while the low points points 11e and 11f are spaced approximately 90° apart.

Cooperating with the peripheral surface of the positioning cam 11 and with the surfaces of the conical cams 9 and 10 is a spring-pressed, ball-ended detent 12 supported in the shoulder section 4b of the bracket 4. The under surface of the shoulder section is undercut to provide the necessary clearance for the conical cams 9 and 10 and the lobes of the cam 11 as indicated at 4d in Fig. 2. The shoulder section is further provided with a recessed vertical opening 4e which supports a flanged collar 13. Received within the collar 13 is the ball-ended detent 12 urged downwardly to cooperate with the cams 9, 10, and 11 by a spring 13a disposed within a suitable recess 12a in the detent. The upper end of the spring 13a abuts the arms 2a of the mounting bracket.

From the description thus far made of our circuit controller, it will be apparent that the operating shaft 7 may be angularly positioned and retained in any one of three positions as determined by the low points 11d, 11e, or 11f of the positioning cam 11 and the spring urged detent 12. The operating shaft 7 may also be moved longitudinally, inwardly or outwardly, when the shaft is in any one of the three angular positions determined by the low points of the positioning cam. The cooperation of the ball-ended detent 12 with the surfaces of conical cams 9 and 10 is such that after moving the shaft 7 either outwardly or inwardly and releasing the operating lever 8, the detent will cam the shaft to its intermediate position as illustrated in Fig. 1.

Means are provided for limiting the inward and outward movement of the operating shaft 7 to only one of the three possible angular positions of the shaft and to permit limited outward movement of the operating shaft in the two remaining angular positions of the shaft.

To this end, the conical cam 10 is provided with a horizontally extending pin 14 which is adapted to enter a through opening 4f in the bracket wall section 4b when the operating lever 8 is pushed inwardly. The opening 4f of the wall section is so positioned that the pin 14 will enter the opening when and only when the shaft 7 is in the angular position determined by the detent 12 and the low point 11d of the positioning cam. In any other angular position of the operating shaft as determined by the detent 12 and the low point 11e or 11f of the cam, the inward movement of the operating schaft will be stopped by the abutment of the end of the pin 14 against the bracket wall section 4a.

Outward movement of the shaft 7 by the operating knob 8 is also restricted to the angular position of the shaft in which the detent 12 engages the low point 11d of the positioning cam. A peripheral cam 15, which will hereinafter be more fully described, is secured to the operating shaft 7 on the inner side of the bracket wall section 4a and spaced therefrom. The cam 15 is provided with a horizontally extending pin 16 which is adapted to enter the opening 4f in the wall section 4a when and only when the operating shaft is in the angular position illustrated in Figs. 1 and 2.

In Fig. 5 of the drawings, the operating lever 8 is illustrated in its innermost position, the shaft 7 being in its angular position determined by the detent 12 and low point 11d of the positioning cam and moved longitudinally to the right so that pin 14 on the conical cam 10 is received within the opening 4f of the bracket wall section 4a. It will be noted that the conical cam 9 has cammed the ball-ended detent 12 upwardly, thereby compressing the spring 13a. Release of the operating lever 8 will permit the spring 13a to force the detent 12 downwardly to move the shaft 7 longitudinally to the left to return the shaft to its intermediate position. It will be appreciated that the end of pin 14 enters the opening 4f before the low point 11d of the cam is moved from under the detent. Thus the operating lever 8 cannot be turned at the time the lever is moved inwardly.

In Fig. 6 of the drawings the operating lever 8 is illustrated in its withdrawn position. The operating shaft 7 being in the angular position determined by the detent 12 and the low point 11d of the positioning cam is moved longitudinally to the left so that pin 16 on cam 15 enters the opening 4f of the bracket wall section 4a. Release of the control lever 8 will permit the compressed detent spring 13a to return the operating shaft to its intermediate position.

For purposes hereinafter appearing, limited withdrawal of the operating shaft 7 in the other two angular positions of the shaft is permitted by two angularly spaced shallow recesses 4g and 4h provided in the interior surface of the wall section 4a. When the angular position of the operating shaft 7 is such that the detent 12 registers with the low point 11e of the positioning cam, limited withdrawal of the operating shaft is possible, the pin 16 entering the recess 4g. When the detent 12 registers with the low point 11f of the cam, the pin 16 may enter the recess 4h when the operating lever 8 is partially withdrawn.

The three rotary and two longitudinal positions provided for the operating shaft are used to operate a plurality of electrical contacts. To this end there is fixed to the upper bracket arm 2a as by screws 17, a horizontal support 18 of insulation material. Secured to the horizontal support as by bolts 19 and threaded plates 20, are two similar and adjacent stacks (Fig. 3) of spring contact fingers, only one stack being fully illustrated in the drawings. A stack of spring contact fingers comprises fixed fingers 21, 22 and 23 and movable fingers 24 and 25 separated by the usual insulating segments 26. The fixed contact fingers 21 and 23 are biased downwardly against their respective stops 21a and 23a, while fixed contact finger 22 is biased upwardly against its stop 22a. The movable contact finger 24 is biased downwardly to engage the fixed contact finger 22, while the movable contact finger 25 is biased downwardly to disengage the fixed contact finger 23. The ends of the movable contact fingers 24 of both stacks of contact fingers are secured by rivets 27a to a dependent cam follower 27 made of insulation material (Fig. 3), while the ends of the movable contact fingers 25 are secured by rivets 28a to a dependent cam follower 28 also made of insulation material. The cam follower 27 is adapted to ride over the periphery of the cam 15, while the cam follower 28 is adapted to ride over the periphery of a second cam 29 secured to the operating shaft 7 adjacent to the cam 15.

The peripheral cam 15 is kidney-shaped, being formed with an intermediate point 15a, a low point 15b and a high point 15c with respect to the center line of the operating shaft, the points 15b and 15c being spaced approximately 90° apart, while points 15a and 15b and points 15a and 15c are spaced approximately 135° apart (Figs. 1 and 4). The cam 15 is eccentrically secured to the operating shaft 7. To insure the proper angular relationship of the operating surfaces of the cam 15 with the operating shaft and cam 11, the cam 15 is provided with a squared opening through which a squared portion of tthe operating shaft passes.

The peripheral cam 29 is substantially oval-shaped and eccentrically mounted on the operating shaft 7. The cam 29 is also mounted on a squared portion of the operating shaft 7 to insure proper angular position relative to the shaft and the cams 11 and 15. With respect to the operating shaft 7, the cam 29 is provided with a high point 29a (Fig. 3) and two low points 29b and 29c which are equidistant from the center of shaft 7, the points 29b and 29c being spaced approximately 90° apart and 135° from the high point 29a. The high point 29a of cam 29 is angularly coincident with the intermediate point 15a on cam 15. It will be noted in Figs. 3 and 4 that the points 15a and 29a are equidistant from the center line of the operating shaft 7. The two remaining points 29b and 29c of cam 29 are angularly coincident with points 15b and 15c of cam 15.

In the angular position of the operating shaft 7 wherein the detent 12 engages the low point 11d of the cam 11, the cam follower 27 engages the intermediate point 15a of cam 15 while the cam follower 28 engages the high point 29a of cam 29. The cam follower 27 raises the movable contact finger 24 slightly against its bias to position the contact finger midway between the fixed contacts 21 and 22. Contacts 21—24 and 22—24 are thus open. The cam follower 28 raises the movable contact finger 25 against its bias to engage the fixed contact finger 23. Contacts 23—25 are thus closed.

Rotation of the operating lever 8 counterclockwise (Figs. 2 and 4) 135° to the position wherein the detent 12 engages the low point 11e of the positioning cam will drop the cam followers 27 and 28 to the low points 15b and 29b of their respective cams as indicated in phantom lines in Fig. 4. Movable contact 24 will then engage the fixed contact 22 and movable contact 25 will disengage fixed contacts 23. In this angular position of the operating shaft 9, contacts 21—24 will be open, contacts 22—24 will be closed, and contacts 23—25 will be opened.

In the third angular position of the operating shaft 7 wherein the detent 12 engages the low point 11f of the positioning cam, the cam follower 27 will engage the high point 15c of cam 15 while cam follower 28 will engage the low point 29c of cam 29 as indicated in phantom line in Fig. 4, and in Fig. 7. The movable contact 24 will be lifted to disengage the fixed contact 22 and engage the fixed contact 21 while movable contact 25 will remain in its lowered position. Contacts 21—24 will be closed and contacts 22—24 and 23—25 will be open in the third angular position of the operating shaft.

A second stack of contact fingers is also secured to the mounting bracket 2 of our circuit controller, the contact fingers being adapted to be actuated upon longitudinal movement of the operating shaft 7 when the shaft is in its first angular position as determined by the detent 12 and the low point 11d of the positioning cam.

Secured to the lower arm 2b of the mounting bracket as by screws 31, is a horizontally extending support 32 of insulation material. Fastened to the support 32 as by screws 33 and threaded plate 34 are fixed spring contact fingers 35 and 36 and movable spring contact fingers 37 and 38 separated by insulation segments 39. The fixed contact fingers 35 and 36 are biased upwardly against their respective stops 35a and 36a secured in the stack by the screws 33. The movable contact 37 is biased downwardly to engage the fixed contact 35, while the movable contact 38 is biased upwardly to disengage the fixed contact 36. The ends of the movable contact fingers 37 and 38 are provided with camming fingers 40 and 41, respectively, of insulation material.

To actuate the contacts 35—37 and 36—38, the inner end of the operating shaft has secured thereto an ogival shaped cam 42. When the operating shaft is in its intermediate longitudinal position illustrated in Fig. 1, the point 42a of the cam 42 lies under the camming finger 40 of the movable contact 37. The base 42b of the cam abuts the top surface of the camming finger 41 of the movable contact 38 moving the movable contact downwardly against its bias into engagement with the fixed contact 36. Thus with the operating shaft 7 in its intermediate longitudinal position, the contacts 35—37 and 36—38 are closed.

When the operating lever 8 is pushed in as illustrated in Fig. 5, the shaft 7 moves the cam 42 toward the right to cam the movable contact 37 upwardly, thereby opening the contacts 35—37. The contacts 36—38 will remain closed. When the operating lever is pulled out to its outermost position as illustrated in Fig. 6, the cam 42 is moved to the left to disengage the camming fingers 40 and 41. Contacts 35—37 are closed while contacts 36—38 will open due to the release of the upwardly biased movable contact 38.

It will be noted that the longitudinal movement of the operating shaft in the angular position determined by point 11d on the positioning cam and detent 12, will not actuate the contacts controlled by the cam 15 or the cam 29. As previously pointed out, the points 15a and 29a of the two cams are at the same radial distance from the center line of the operating shaft. Thus, when the shaft is moved to the right (Fig. 5) the cam followers 27 and 28 ride on point 15a of cam 15, and when moved to the left (Fig. 6) the cam followers ride on the point 29a of cam 29. The contacts 21—24 and 22—24 thus remain open and contacts 23—25 remain closed when the operating lever 8 is either pushed in or pulled out.

In Fig. 7 of the drawings we have illustrated the operating shaft 7 in one of its partially withdrawn positions. It will be noted that the peripheral surfaces of the cams 15, 29, and 42 are of such longitudinal extent that the cam followers 27 and 28 and the camming finger 41 engage the cam surfaces 15a, 29a, and 42b of their respective cams. Thus the partial withdrawal of the operating lever 8 will not actuate the contacts in any manner.

To permit locking of the operating shaft 7 in either of the two positions wherein limited withdrawal of the operating lever is possible, a lever block 43 (Figs. 7 and 8) is provided for the operating shaft. The lever block 43 is U-shaped, one arm 43a being longer than the other arm 43b. The longer arm 43a is provided with a through opening 43c adjacent its end through which the bail 44a of a padlock 44 may be inserted. The lever block 43 is slightly wider than the space between the head of bushing 5 and the rear surface of the operating lever 8 when the operating shaft is in its intermediate longitudinal position. When the operating shaft is in either of its angular positions in which the operating lever may be partially withdrawn, the lever block 43 may be slipped over the extending portion of the operating shaft and locked thereon, the lever block being clamped between the operating lever 8 and the bushing 5 by the camming action of the detent 12. The bail 44a of the padlock 44 passes underneath the operating shaft so that the lever block may not be removed. The operating shaft 7 will be held in its partially withdrawn position by the lever block 43, the shaft being held against rotation by the cooperation of the pin 16 with either of the recesses 4g or 4h in the bracket wall section 4a.

In Figs. 9 to 16, we have illustrated a second embodiment of our circuit controller generally designated by the reference character 46. The circuit controller is mounted on a U-shaped bracket 47 having two rearwardly extending T-shaped arms 47a and 47b interconnected by a vertical front wall 47c. The front wall 47c is provided with a threaded through opening 47d to receive a threaded bushing 48. The threaded bushing 48 secures the bracket 47 to a front panel 6 in the usual manner. Secured between the bracket arms 47a and 47b by screws 49, is a block 50 of insulation material and a second block 51. The block 50 is bifurcated, having two forwardly extending arms 50a and 50b. The block 51 is secured betwen the arms 50a and 50b by the screws 49 passing through suitable openings in the arms of the mounting bracket 47 of the insulation block 50.

The blocks 50 and 51 are formed with coaxial recessed openings 50c and 51a, respectively. Journaled in the narrower opening 51b of the recess 51a and in the opening of bushing 48 is a cam assembly 52. The cam assembly 52 is a one-piece casting comprising a shaft 53, a three-lobed positioning cam 54, a drop cam 55, a mutilated conical cam 56, a shaft portion 53a of reduced diameter and a threaded shaft end 53b. The shaft portions 53a and 53b are within the recessed openings 50c and 51a of the blocks 50 and 51, respectively. Received on shaft portion 53a and abutting the shoulder 51d formed by the reduced portion 51b and the shoulder 53c formed by the reduced shaft portion, is a spring retainer washer 57. A second spring retainer washer 58 is received on the other end of the reduced shaft portion 53a. The washer 58 abuts a shoulder 50d of the block 50 and a lockwasher 59 used to secure a slotted nut 60 to the threaded end 53b of the cam assembly. Interposed between the two spring retainer washers 57 and 58 is a coil spring 61 biasing the washers against their respective abutment elements. As will hereinafter appear, the coil spring 61 returns the cam assembly 52 to its intermediate position illustrated after the assembly has been moved longitudinally either to the left or to the right and then released.

Detent means are provided so that the cam assembly 52 may be rotated and positioned in three distinct angular positions. To this end, there is secured between the lower ends of the bracket arms 47a and 47b, as by screws 62, a recessed member 63. Received within the recessed member is a ball-ended detent 64 which is urged upwardly by a spring 65 interposed between the detent and a bottom wall 66 secured to the recessed member.

The top wall 63a of the recessed member 63 is formed with a transverse slot 63b to accommodate the lobed cam 54. The lobed cam 54 is similar to the positioning cam 11 and is provided with two lobes 54a and 54b which are larger than the third lobe 54c. Between the lobes of the positioning cam are low points 54d, 54e, and 54f, the low points 54e and 54f being approximately 90° apart, while the low points 54d and 54e, and 54d and 54f are approximately 135° apart. Cooperation of the ball-ended detent 64 with the positioning cam 54 is the same as that described in connection with the detent 12 and the positioning cam 11. It will be noted that upon rotation of the operating lever 8, the lobes 54a, 54b, and 54c of the positioning cam pass through the transverse slot 63b of the recessed member.

The circuit controller of our second embodiment is also provided with stop means to limit the longitudinal movement of the shaft outwardly and inwardly in only one angular position of the shaft assembly. To limit the outward movement of the shaft assembly 52, two spaced pins 67 and 68 are secured to the inner surface of the front bracket wall 47c. The pins 67 and 68 are so spaced that, when the shaft assembly 52 is in the angular position determined by the detent 64 and the low point 54d of the positioning cam, the operating lever 8 may be pulled out to move the shaft assembly 52 to the right. The lobe 54c of the positioning cam will pass between the two stop pins 67 and 68 (Fig. 10) until the cam abuts the front wall 47c.

The pins 67 and 68 also serve to limit the longitudinal movement of the cam assembly 52 to the right when the shaft assembly is in the angular positions determined by the detent 64 and the low points 54e and 54f of the positioning cam. Rotation of the operating lever 8 clockwise (Fig. 10) will align the lobe 54a of the positioning cam with the pin 68 in the bracket front wall 47c. The longitudinal movement of the cam assembly will abut the lobe 54a against the end of the pin 67, thereby limiting the travel of the assembly. Further clockwise rotation of the operating lever 8 will align the lobe 54b with the pin 67 to limit the longitudinal movement of the assembly. It will be noted that in each of the three angular positions of the cam assembly 52, the lobes of the positioning cam 54 are clear of the groove 63b of the recessed member 63 so that the shaft assembly may be moved longitudinally. The limited longitudinal movement of the cam assembly 52 will permit the locking of the assembly against movement by a lever block 43 in the manner described.

The longitudinal movement of the cam assembly 52 inwardly, or toward the left as viewed in Figs. 9, 11, and 12, is permitted by the flat surface 56a provided on the mutilated conical cam 56. In pushing the operating lever 8 inwardly when the cam assembly is in its angular position determined by the detent 64 and the low point 54d of the positioning cam, the flat surface 56a on the cam 56 passes under an extension 51c (Fig. 12) provided on the top surface of the recessed block 51. In any other angular position of the shaft assembly, the longitudinal movement of the assembly toward the left will be prevented by the abutment of the base 56b of the conical cam 56 with the extension 51c of the recessed block.

Cooperating with the mutilated conical cam 56 and the drop cam 55 are four sets of contact fingers. The four sets of contact fingers are arranged in two stacks secured to the top and bottom wall of the recessed insulation block 50 as by screws 70 and threaded plates 70a. Secured to the top surface of the block 50 are two spaced movable contact fingers 71 and 72, the free ends of which are riveted to a bridge member 73 of insulation material (Fig. 13). Integrally formed on the bridge member 73 is a dependent cam follower 74 adapted to cooperate with the cam 55. Secured to the block 50 between the movable contacts 71 and 72 is a third movable contact 75 having secured to its free end a dependent cam follower 76 of insulation material, the cam follower 76 cooperating with the cam 56. The movable contact fingers 71 and 72 cooperate with fixed contact fingers 77 and 78, respectively, while movable contact finger 75 cooperates with a fixed contact 79. The movable contacts 71, 72, and 75 are biased downwardly so that movable contacts 71 and 72 normally would disengage the fixed contacts 77 and 78 and movable contact 75 would engaged fixed contact 79.

Secured to the bottom surface of the insulation block 50 are two spaced movable contact fingers 80 and 81, the free ends of which are secured to a bridge member 82 of insulation material. Integral with the bridge member 82 is an upright cam follower 83 adapted to cooperate with the drop cam 55. A third movable contact finger 84 is secured to the block 51 between the movable contacts 80 and 81. The outer end of contact finger 84 has secured thereto an upright cam follower 85 of insulation material, the follower 85 being adapted to cooperate with the mutilated conical cam 56. The movable contact fingers 80 and 81 cooperate with fixed contact fingers 86, 87 and 88, 89, respectively, while the movable contact finger 84 cooperates with a fixed contact finger 90. The movable contact fingers 80, 81, and 84 are biased upwardly to engage the contact fingers 86, 88, and 90, respectively.

Referring now to Figs. 14 to 16, when the controller lever 8 is in the angular position determined by the detent 64 and the low point 54d of the positioning cam 54, the drop cam 55 is in the angular position illustrated in Fig. 14. The high point 55a of the cam lifts the cam follower 74 and bridge 73 to close the contacts 71—77 and 72—78. The arcuate section 55b of the cam is engaged by the cam follower 83 of the bridge 82, thereby positioning the lower movable contacts 80 and 81 midway between the fixed contacts 86, 87 and 88, 89, respectively. The contacts 80—86, 80—87, 81—88 and 81—89 are thus held open when the operating lever 8 is in its intermediate or initial position illustrated in Fig. 14.

Rotation of the operating lever 8 in a counterclockwise direction to the angular position determined by the detent 64 and the low point 54e of the positioning cam will rotate the drop cam 55 to the position illustrated in Fig. 15. The arcuate section 55b of the drop cam will permit the contacts 71—77 and 72—78 to open, while the drop portion 55c of the cam is approximately parallel with the cam follower 83 to permit the contacts 80—86 and 81—88 to close.

A further rotation of the control lever 8 in a counterclockwise direction will rotate the drop cam 55 to the angular position determined by the detent 64 and the low point 54f of the positioning cam as illustrated in Fig. 16. The high point 55a of the drop cam moves the cam follower 83 downwardly to open the contacts 80—86 and 81—88 and to close the contacts 80—87 and 81—89. The arcuate section 55b of the drop cam has been moved past the cam follower 74 so that the edge formed by the arcuate section and the drop section of the cam is engaged by the follower to maintain the contacts 71—77 and 72—78 open.

It will be understood that while we have described the operating lever as being rotated in a counterclockwise direction, the control lever may be rotated in either direction and from any one position through any other position of the cam assembly.

Referring now to Fig. 12, the longitudinal movement of the cam assembly 52 in the angular position determined by the detent 64 and the low point 54d of the positioning cam will actuate the contacts 75—79 and 84—90. When the cam assembly is in its intermediate longitudinal position as illustrated in Fig. 12, the cam followers 76 and 85 engage the circular or collar portion 56c of the cam 56, the contacts 75—79 and 84—90 being closed. In rotating the cam assembly to any of its three angular positions determined by the positioning cam 54, the cam followers 76 and 85 ride over the collar portion 56c to maintain the contacts 75—79 and 84—90 closed.

When the operating lever is pulled out, the cam 56 is moved to the right so that cam follower 76 engages the flat portion 56a of the cam, while cam follower 85 rides over the conical portion 56d, thereby biasing the contact finger 84 downwardly. The contacts 75—79 are thus maintained closed while contacts 84—90 are opened when the operating lever is pulled out.

Contacts 75—79 will be opened and contacts 84—90 will be maintained closed when the operating lever 8 is pushed in to move the cam assembly to the left. As previously described, the flat portion 56a of the cam 56 will slide under the extension 51b of the block 51. The cam follower 76 will ride up a slope portion 55d of the drop cam 55 to open contacts 75—79. Cam follower 85 will ride over an arcuate portion 55e of the drop cam having the same radius as the collar portion 56c of the cam 56. The contacts 84—90 will thus be maintained closed.

The partial withdrawal of the operating lever 8 in the angular positions of the cam assembly determined by the detent 64 and the low points 54e and 54f of the positioning cam, in the manner and for the purpose previously described, will not cause the actuation of the contacts 75—79 or 84—90. The partial withdrawal of the operating lever will move the cam assembly toward the right only a short distance, the cam followers 76 and 85 remaining on the collar portion 56c of the mutilated conical cam 56. Thus upon partial withdrawal of the operating lever 8 the contacts 75—79 and 84—90 will remain closed.

The circuit controllers herein illustrated and described, in addition to the advantages of few and simple parts, compactness, and ease of operation, have the advantage of positive actuation of a given set of contacts in only the predetermined angular or longitudinal position of the operating shaft. The circuit controllers embodying our invention are further advantageous in that the operating lever may be rotated from any angular position of the operating shaft through any other angular position of the shaft while longitudinal movement of the shaft is limited to but one of the angular positions, thereby insuring the proper sequence of contact actuation.

Although we have herein shown and described two forms of circuit controllers embodying our invention, it is understood that various changes and modifications may be made therein within the scope of the appended claims without departing from the spirit and scope of our invention.

Having thus described our invention what we claim is:

1. In a circuit controller, the combination comprising a cam assembly longitudinally movable between first and second positions and rotatably movable into a plurality of angular positions, an operating lever for moving said cam assembly longitudinally and rotatably, a first resilient means biasing said cam assembly to a position intermediate its first and second longitudinal positions, said resilient means also holding said cam assembly in its angular positions, and means cooperating with said cam assembly permitting the longitudinal movement of the cam assembly to its first position and to its second position only when said cam assembly is in a predetermined angular position.

2. In a circuit controller, the combination comprising a frame, a cam assembly mounted on said frame, said cam assembly being longitudinally movable between first and second positions and rotatably movable into a plurality of angular positions, an operating lever for moving said cam assembly longitudinally and rotatably, resilient means biasing said cam assembly to a position intermediate its first and second longitudinal positions, and cooperating means on said frame and on said cam assembly permitting the longitudinal movement of the cam assembly to its first position and to its second position against the bias of said resilient means only when said cam assembly is in a predetermined angular position, and limited longitudinal movement of said cam assembly to one of its two positions when said cam assembly is in any angular position other than the predetermined angular position.

3. In a circuit controller, the combination comprising a cam assembly longitudinally movable between first and second positions and rotatably movable into a plurality of angular positions, an operating lever for moving said cam assembly longitudinally and rotatably, a resilient means biasing said cam assembly to a position intermediate its first and second longitudinal positions, said resilient means also holding said cam assembly in its angular positions, and means cooperating with said cam assembly permitting the longitudinal movement of the cam assembly to its first position and to its second position only when said cam assembly is in a predetermined angular position, said last means including means permitting limited longitudinal movement of said cam assembly to one of its two positions when said cam assembly is in any angular position other than the predetermined angular position.

4. A circuit controller comprising a cam assembly longitudinally movable between first and second positions and rotatably movable into a plurality of angular positions, said cam assembly including a positioning cam and at least two contact actuating cams, a detent cooperating with said positioning cam for holding said cam assembly in its angular positions, an operating lever for moving said cam assembly longitudinally and rotatably, resilient means biasing said cam assembly to a position intermediate the first and second longitudinal positions, means cooperating with said cam assembly permitting the longitudinal movement of the cam assembly to its first position and to its second position against the bias of said resilient means only when said cam assembly is in a predetermined angular position, and electrical contacts for each of said contact actuating cams of said cam assembly selectively actuated by their respective cams in accordance with the longitudinal and angular positions of the cam assembly.

5. A circuit controller comprising a cam assembly longitudinally movable between first and second positions and rotatably movable into a plurality of angular positions; said cam assembly including an angular positioning cam, a longitudinal positioning cam, and at least two contact actuating cams, a resiliently biased detent cooperating with both said angular and longitudinal positioning cams to hold said cam assembly in its angular positions and to bias said cam assembly to a position intermediate the first and second longitudinal positions, an operating lever for moving said cam assembly longitudinally and rotatably, means cooperating with said cam assembly permitting the longitudinal movement of the cam assembly to its first position and to its second position against the bias of said detent only when said cam assembly is in a predetermined angular position, and electrical contacts for each of said contact actuating cams of said cam assembly selectively actuated by their respective cams in accordance with the longitudinal and angular positions of the cam assembly.

6. A circuit controller comprising a cam assembly longitudinally movable between first and second positions and rotatably movable into a plurality of angular positions; said cam assembly including an angular positioning cam, a longitudinal positioning cam, and at least two contact actuating cams; a resiliently biased detent cooperating with both said angular and longitudinal positioning cams to hold said cam assembly in its angular positions and to bias said cam assembly to a position intermediate the first and second longitudinal positions, an operating lever for moving said cam assembly longitudinally and rotatably, means cooperating with said cam assembly permitting the longitudinal movement of the cam assembly to its first position and to its second position against the bias of said detent only when said cam assembly is in a predetermined angular position, and electrical contacts for each of said contact actuating cams of said cam assembly selectively actuated by their respective cams in accordance with the longitudinal and angular positions of the cam assembly, said last means including means permitting limited longitudinal movement of said cam assembly to one of its two positions when said cam assembly is in any angular position other than the predetermined angular position.

7. A circuit controller comprising a support having an opening, a cam assembly longitudinally movable between two extreme positions and rotatably movable into a plurality of angular positions on said support; said cam assembly including an angular positioning cam, a longitudinal positioning cam and at least two contact actuating cams; an operating lever for moving said cam assembly longitudinally and rotatably, a resiliently biased detent cooperating with both said angular and longitudinal positioning cams to hold said cam assembly in its angular positions and to bias said cam assembly to a position intermediate its two extreme longitudinal positions, axial aligned pins in one of said positioning cams and in one of said contact actuating cams adapted to cooperate with the opening in said support only when said cam assembly is in a predetermined angular position to permit longitudinal movement of said cam assembly to its two extreme positions against the bias of said detent, and electrical contacts for each of said contact actuating cams of said cam assembly selectively actuated by their respective cams in accordance with the longitudinal and angular positions of the cam assembly.

8. A circuit controller comprising a support having an opening, a cam assembly longitudinally movable between two extreme positions and rotatably movable into a plurality of angular positions on said support; said cam assembly including an angular positioning cam, a longitudinal positioning cam and at least two contact actuating cams, an operating lever for moving said cam assembly longitudinally and rotatably, a resiliently biased detent cooperating with both of said positioning cams to hold said cam assembly in its angular positions and to bias said cam assembly to a position intermediate its two extreme longitudinal positions, axial aligned pins in one of said positioning cams and in one of said contact actuating cams adapted to cooperate with the opening in said support only when said cam assembly is in a predetermined angular position to permit longitudinial movement of said cam assembly to its two extreme positions against the bias of said detent, a recess in said support for each of the other angular positions of the cam assembly adapted to be engaged by one of said pins to permit limited longitudinal movement of said cam assembly toward one of its extreme positions, and electrical contacts for each of said contact actuating cams of said cam assembly selectively actuated by their respective cams in accordance with the longitudinal and angular positions of the cam assembly.

9. A circuit controller comprising a support having an opening, a cam assembly longitudinally movable between two extreme positions and rotatably movable into a plurality of angular positions on said support; said cam assembly including an angular positioning cam, a longitudinal positioning cam and three contact actuating cams, an operating lever for moving said cam assembly longitudinally and rotatably, a resiliently biased detent cooperating with both said angular and longitudinal positioning cams to hold said cam assembly in its angular positions and to bias said cam assembly to a position intermediate its two extreme longitudinal positions, axial aligned pins in one of said positioning cams and in one of said contact actuating cams adapted to cooperate with the opening in said support only when said cam assembly is in a predetermined angular position to permit longitudinal movement of said cam assembly to its two extreme positions against the bias of said detent, and a set of electrical contacts for each of said contact actuating cams of the cam assembly adapted to be actuated by their respective cams, two of said sets of contacts being actuated in accordance with the angular position of two of said cams, the third set of said contacts being actuated by the third cam only upon the longitudinal movement of the cam upon longitudinal movement of the cam assembly to its extreme positions.

10. A circuit controller comprising a frame having an opening, a cam assembly longitudinally movable between two extreme positions and rotatably movable into a plurality of angular positions on said frame; said cam assembly including an angular positioning cam, a longitudinal positioning cam and three contact actuating cams, an operating lever for moving said cam assembly longitudinally and rotatably, a resiliently biased detent cooperating with both said angular and longitudinal positioning cams to hold said cam assembly in its angular positions and to bias said cam assembly to a position intermediate its two extreme longitudinal positions, axial aligned pins in one of said positioning cams and in one of said contact actuating cams adapted to cooperate with the opening in said frame only when said cam assembly is in a predetermined angular position to permit longitudinal movement of said cam assembly to its two extreme positions against the bias of said detent, a recess in said frame for each of the other angular positions of the cam assembly adapted to be engaged by one of said pins to permit limited longitudinal movement of said cam assembly toward one of its extreme positions, and a set of electrical contacts for each of said contact actuating cams of the cam assembly adapted to be actuated by their respective cams, two of said sets of contacts being actuated in accordance with the angular position of two of said cams, the third set of said contacts being actuated by the third cam only upon the longitudinal movement of the cam upon longitudinal movement of the cam assembly to its extreme positions; said third cam being ineffective to actuate said third set of contacts by the limited longitudinal movement of said cam assembly toward one of its extreme positions.

11. In a circuit controller having a shaft movable angularly to a plurality of positions and longitudinally to two extreme positions, the combination comprising an angular positioning cam on said shaft formed with a spaced cam surface for each of the angular positions of the shaft, a longitudinal positioning cam on said shaft formed with a cam surface angular coincident with at least one of the cam surfaces on the angular positioning cam, and a resiliently biased detent cooperating with the cam surfaces of both of said cams to hold said shaft in its angular positions and to bias said shaft to a position intermediate its two extreme longitudinal positions.

12. A circuit controller comprising a frame, a cam assembly supported on said frame and movable longitudinally between two extreme positions and rotatably into a plurality of angular positions, said cam assembly including an angular positioning cam and two contact actuating cams; an operating lever for moving said cam assembly longitudinally and rotatably, a detent cooperating with said positioning cam for holding said cam assembly in its angular positions, resilient means biasing said cam assembly to a position intermediate its two extreme longitudinal positions, means on said frame cooperating with said positioning cam permitting the longitudinal movement of said cam assembly to one of its extreme positions in a predetermined angular position of the cam assembly, a second means on said frame cooperating with one of said contact actuating cams to permit the longitudinal movement of the cam assembly to its other extreme position in the predetermined angular position of the cam assembly, and electrical contacts for each of said contact actuating cams of said cam assembly selectively actuated by their respective cams in accordance with the longitudinal and angular positions of the cam assembly.

13. A circuit controller comprising a frame, a cam assembly supported on said frame and movable longitudinally between two extreme positions and rotatably into a plurality of angular positions, said cam assembly including an angular positioning cam and two contact actuating cams; an operating lever for moving said cam assembly longitudinally and rotatably, resilient means biasing said cam assembly to a position intermediate its two extreme longitudinal positions, means on said frame cooperating with said positioning cam permitting the longitudinal movement of said cam assembly to one of its extreme positions in a predetermined angular position of the cam assembly, a second means on said frame cooperating with one of said contact actuating cams to permit the longitudinal movement of the cam assembly to its other extreme position in the predetermined angular position of the cam assembly, and electrical contacts for each of said contact actuating cams of said cam assembly selectively actuated by their respective cams in accordance with the longitudinal and angular positions of the cam assembly.

14. A circuit controller comprising a frame, a cam assembly supported on said frame and movable longitudinally between two extreme positions and rotatably into a plurality of angular positions, said cam assembly including an angular positioning cam and two contact actuating cams, said contact actuating cams being in juxtaposition, the first of said cams being formed with an arcuate portion, the second of said cams being formed with a high point having a descending slope at one end thereof terminating at its lower end in the arcuate portion of the first cam, an operating lever for moving said cam assembly longitudinally and rotatably, a detent cooperating with said positioning cam for holding said cam assembly in its angular positions, resilient means biasing said cam assembly to a position intermediate its two extreme longitudinal positions, means on said frame cooperating with said positioning cam permitting the longitudinal movement of said cam assembly to one of its extreme positions in a predetermined angular position of the cam assembly, a second means on said frame cooperating with one of said contact actuating cams to permit the longitudinal movement of the cam assembly to its other extreme position in the predetermined angular position of the cam assembly, two cam followers for each of said contact actuating cams spaced approximately 180° apart, and electrical contacts secured to said frame and selectively actuated by said cam followers, the first contact actuating cam actuating its associated contacts in all of the angular positions of the cam assembly and the contacts associated with the second cam in one extreme longitudinal position of the cam assembly, the second contact actuating cam actuating its associated contacts in the other extreme longitudinal position of the cam assembly.

15. A circuit controller comprising a frame, a cam assembly supported on said frame and movable longitudinally between two extreme positions and rotatably into a plurality of angular positions, said cam assembly including an angular positioning cam and two contact actuating cams; said contact actuating cams being in juxtaposition, the first of said cams being formed with an arcuate portion, the second of said cams being formed with a high point having a descending slope at one end thereof terminating at its lower end in the arcuate portion of the first cam; an operating lever for moving said cam assembly longitudinally and rotatably, a detent cooperating with said positioning cam for holding said cam assembly in its angular positions, resilient means biasing said cam assembly to a position intermediate its two extreme longitudinal positions, means on said frame cooperating with said positioning cam permitting the longitudinal movement of said cam assembly to one of its extreme positions in a predetermined angular position of the cam assembly, a second means on said frame cooperating with one of said contact actuating cams to permit the longitudinal movement of the cam assembly to its other extreme position in the predetermined angular position of the cam assembly, two cam followers for each of said contact actuating cams spaced approximately 180° apart, an electrical contacts secured to said frame and selectively actuated by said cam followers, the first contact actuating cam actuating its associated contacts in all of the angular positions of the cam assembly and the contacts associated with the second cam in one extreme longitudinal position of the cam assembly, the second contact actuating cam actuating its associated contacts in the other extreme longitudinal position of the cam assembly, the arcuate portion of said first cam being ineffective to actuate the contacts associated with said cam during angular movement and limited longitudinal movement toward the one extreme position of said cam assembly.

16. A circuit controller comprising a cam assembly longitudinally movable between first and second positions and rotatably movable into three angular positions, means biasing said cam assembly to a position intermediate its first and second longitudinal positions, means cooperating with said cam assembly permitting longitudinal movement of the cam assembly to its first and second positions against the bias of said biasing means only when said cam assembly is in a predetermined angular position, two sets of electrical contacts for selective actuation by said cam assembly upon longitudinal movement of the cam assembly, the first of said two sets of contacts being actuated when said assembly is in its intermediate and second longitudinal positions, the other set of said two sets of contacts being actuated when said assembly is in its first and intermediate longitudinal positions; and three sets of contacts for selective actuation by said cam assembly upon angular movement of the cam assembly, the first set of contacts of the three sets being actuated when said cam assembly is in its first angular position, the second set of contacts being actuated when the cam assembly is in its second angular position, and the third set of said three sets of contacts being actuated when the cam assembly is in its third angular position.

References Cited in the file of this patent

UNITED STATES PATENTS

| | | |
|---|---|---|
| 2,305,185 | Merkel | Dec. 15, 1942 |
| 2,289,736 | Snavely et al. | July 14, 1942 |
| 2,590,658 | Silvius | Mar. 25, 1952 |
| 2,669,611 | Silvius | Feb. 16, 1954 |